(12) United States Patent
Collins et al.

(10) Patent No.: US 12,348,478 B2
(45) Date of Patent: *Jul. 1, 2025

(54) CONTENT COLLECTION INTERFACE

(71) Applicant: Snap Inc., Santa Monica, CA (US)

(72) Inventors: Alexander Collins, Santa Monica, CA (US); Benedict Copping, Los Angeles, CA (US); Justin Huang, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,706

(22) Filed: Nov. 1, 2023

(65) Prior Publication Data
US 2024/0064123 A1 Feb. 22, 2024

Related U.S. Application Data

(63) Continuation of application No. 16/880,396, filed on May 21, 2020, now Pat. No. 11,843,574.

(51) Int. Cl.
*H04L 12/00* (2006.01)
*G06F 16/44* (2019.01)
(Continued)

(52) U.S. Cl.
CPC ............ *H04L 51/52* (2022.05); *G06F 16/447* (2019.01); *G06F 16/489* (2019.01); *G06T 11/60* (2013.01)

(58) Field of Classification Search
CPC ....... H04L 51/52; H04L 51/224; H04L 51/10; H04L 51/18; G06F 16/447; G06F 16/489; G06T 11/60
(Continued)

(56) References Cited

U.S. PATENT DOCUMENTS

| 5,754,939 A | 5/1998 | Herz et al. |
| 6,038,295 A | 3/2000 | Mattes |

(Continued)

FOREIGN PATENT DOCUMENTS

| CA | 2887596 A1 | 7/2015 |
| CN | 106415476 A | 2/2017 |

(Continued)

OTHER PUBLICATIONS

"U.S. Appl. No. 16/880,396, Examiner Interview Summary mailed Jul. 20, 2022", 3 pgs.

(Continued)

*Primary Examiner* — Frantz Coby
(74) *Attorney, Agent, or Firm* — SCHWEGMAN LUNDBERG & WOESSNER, P.A.

(57) ABSTRACT

Systems and methods are provided for receiving a first plurality of media content items during a first time interval, identifying, from the first plurality of media content items, a first subset of media content items based on a first characteristic, and identifying, from the first subset of media content items, a second subset of media content items based on a second characteristic. The systems and methods are also provided for generating a first sequenced content collection including the first subset and the second subset and causing a first content collection interface to be displayed by the first computing device, the first content collection interface comprising the first sequenced content collection.

20 Claims, 13 Drawing Sheets

(51) Int. Cl.
  *G06F 16/48* (2019.01)
  *G06T 11/60* (2006.01)
  *H04L 51/52* (2022.01)
(58) Field of Classification Search
  USPC .................................................... 709/206
  See application file for complete search history.

(56) References Cited

U.S. PATENT DOCUMENTS

| | | | |
|---|---|---|---|
| 6,158,044 A | 12/2000 | Tibbetts | |
| 6,167,435 A | 12/2000 | Druckenmiller et al. | |
| 6,205,432 B1 | 3/2001 | Gabbard et al. | |
| 6,310,694 B1 | 10/2001 | Okimoto et al. | |
| 6,484,196 B1 | 11/2002 | Maurille | |
| 6,487,586 B2 | 11/2002 | Ogilvie et al. | |
| 6,665,531 B1 | 12/2003 | Soderbacka et al. | |
| 6,701,347 B1 | 3/2004 | Ogilvie | |
| 6,711,608 B1 | 3/2004 | Ogilvie | |
| 6,757,713 B1 | 6/2004 | Ogilvie et al. | |
| 6,980,909 B2 | 12/2005 | Root et al. | |
| 7,124,164 B1 | 10/2006 | Chemtob | |
| 7,149,893 B1 | 12/2006 | Leonard et al. | |
| 7,173,651 B1 | 2/2007 | Knowles | |
| 7,243,163 B1 | 7/2007 | Friend et al. | |
| 7,278,168 B1 | 10/2007 | Chaudhury et al. | |
| 7,356,564 B2 | 4/2008 | Hartselle et al. | |
| 7,376,715 B2 | 5/2008 | Cunningham et al. | |
| 7,411,493 B2 | 8/2008 | Smith | |
| 7,478,402 B2 | 1/2009 | Christensen et al. | |
| 7,496,347 B2 | 2/2009 | Puranik | |
| 7,519,670 B2 | 4/2009 | Hagale et al. | |
| 7,535,890 B2 | 5/2009 | Rojas | |
| 7,607,096 B2 | 10/2009 | Oreizy et al. | |
| 7,703,140 B2 | 4/2010 | Nath et al. | |
| 7,912,896 B2 | 3/2011 | Wolovitz et al. | |
| 8,131,597 B2 | 3/2012 | Hudetz | |
| 8,140,528 B2 * | 3/2012 | Priebe ................ | H04L 12/1822 709/206 |
| 8,170,957 B2 | 5/2012 | Richard | |
| 8,199,747 B2 | 6/2012 | Rojas et al. | |
| 8,214,443 B2 | 7/2012 | Hamburg | |
| 8,238,947 B2 | 8/2012 | Lottin et al. | |
| 8,244,593 B2 | 8/2012 | Klinger et al. | |
| 8,312,097 B1 | 11/2012 | Siegel et al. | |
| 8,332,475 B2 | 12/2012 | Rosen et al. | |
| 8,570,907 B2 | 10/2013 | Garcia, Jr. et al. | |
| 8,718,333 B2 | 5/2014 | Wolf et al. | |
| 8,724,622 B2 | 5/2014 | Rojas | |
| 8,745,132 B2 | 6/2014 | Obradovich | |
| 8,874,677 B2 | 10/2014 | Rosen et al. | |
| 8,909,679 B2 | 12/2014 | Root et al. | |
| 8,909,714 B2 | 12/2014 | Agarwal et al. | |
| 8,909,725 B1 | 12/2014 | Sehn | |
| 8,914,752 B1 | 12/2014 | Spiegel | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,081,777 B1 | 7/2015 | Krawczyk | |
| 9,083,770 B1 | 7/2015 | Drose et al. | |
| 9,094,137 B1 | 7/2015 | Sehn et al. | |
| 9,100,806 B2 | 8/2015 | Rosen et al. | |
| 9,100,807 B2 | 8/2015 | Rosen et al. | |
| 9,113,301 B1 | 8/2015 | Spiegel et al. | |
| 9,148,424 B1 | 9/2015 | Yang | |
| 9,191,776 B2 | 11/2015 | Root et al. | |
| 9,204,252 B2 | 12/2015 | Root | |
| 9,213,776 B1 | 12/2015 | Ledet | |
| 9,225,805 B2 | 12/2015 | Kujawa et al. | |
| 9,225,897 B1 | 12/2015 | Sehn et al. | |
| 9,237,202 B1 | 1/2016 | Sehn | |
| 9,264,463 B2 | 2/2016 | Rubinstein et al. | |
| 9,276,886 B1 | 3/2016 | Samaranayake | |
| 9,294,425 B1 | 3/2016 | Son | |
| 9,385,983 B1 | 7/2016 | Sehn | |
| 9,396,354 B1 | 7/2016 | Murphy et al. | |
| 9,407,712 B1 | 8/2016 | Sehn | |
| 9,407,816 B1 | 8/2016 | Sehn | |
| 9,430,783 B1 | 8/2016 | Sehn | |
| 9,443,227 B2 | 9/2016 | Evans et al. | |
| 9,482,882 B1 | 11/2016 | Hanover et al. | |
| 9,482,883 B1 | 11/2016 | Meisenholder | |
| 9,489,661 B2 | 11/2016 | Evans et al. | |
| 9,491,134 B2 | 11/2016 | Rosen et al. | |
| 9,532,171 B2 | 12/2016 | Allen et al. | |
| 9,537,811 B2 | 1/2017 | Allen et al. | |
| 9,560,006 B2 | 1/2017 | Prado et al. | |
| 9,628,950 B1 | 4/2017 | Noeth et al. | |
| 9,652,896 B1 | 5/2017 | Jurgenson et al. | |
| 9,659,244 B2 | 5/2017 | Anderton et al. | |
| 9,693,191 B2 | 6/2017 | Sehn | |
| 9,705,831 B2 | 7/2017 | Spiegel | |
| 9,742,713 B2 | 8/2017 | Spiegel et al. | |
| 9,785,796 B1 | 10/2017 | Murphy et al. | |
| 9,825,898 B2 | 11/2017 | Sehn | |
| 9,854,219 B2 | 12/2017 | Sehn | |
| 9,961,520 B2 | 5/2018 | Brooks et al. | |
| 10,102,593 B2 * | 10/2018 | Benfield ................ | G06F 16/41 |
| 10,110,545 B1 | 10/2018 | Freay et al. | |
| 10,809,890 B1 | 10/2020 | Krawczyk | |
| 10,917,690 B1 | 2/2021 | Knas et al. | |
| 10,949,052 B2 * | 3/2021 | Carrigan ............... | H04L 67/306 |
| 11,080,466 B2 * | 8/2021 | Nelson ................. | G06F 40/117 |
| 11,113,333 B2 * | 9/2021 | Maharajh .............. | G06Q 10/10 |
| 11,270,060 B2 * | 3/2022 | Nelson ................. | G06N 20/00 |
| 11,308,035 B2 * | 4/2022 | Prahlad ................ | G06F 3/0631 |
| 11,573,993 B2 * | 2/2023 | Nelson ................. | G06F 16/345 |
| 11,843,574 B2 * | 12/2023 | Collins ................. | G06T 11/60 |
| 2002/0047868 A1 | 4/2002 | Miyazawa | |
| 2002/0144154 A1 | 10/2002 | Tomkow | |
| 2003/0052925 A1 | 3/2003 | Daimon et al. | |
| 2003/0126215 A1 | 7/2003 | Udell | |
| 2003/0217106 A1 | 11/2003 | Adar et al. | |
| 2004/0155888 A1 | 8/2004 | Padgitt et al. | |
| 2004/0203959 A1 | 10/2004 | Coombes | |
| 2005/0097176 A1 | 5/2005 | Schatz et al. | |
| 2005/0198128 A1 | 9/2005 | Anderson | |
| 2005/0223066 A1 | 10/2005 | Buchheit et al. | |
| 2006/0242239 A1 | 10/2006 | Morishima et al. | |
| 2006/0270419 A1 | 11/2006 | Crowley et al. | |
| 2007/0038715 A1 | 2/2007 | Collins et al. | |
| 2007/0064899 A1 | 3/2007 | Boss et al. | |
| 2007/0073823 A1 | 3/2007 | Cohen et al. | |
| 2007/0214216 A1 | 9/2007 | Carrer et al. | |
| 2007/0233801 A1 | 10/2007 | Eren et al. | |
| 2008/0055269 A1 | 3/2008 | Lemay et al. | |
| 2008/0120409 A1 | 5/2008 | Sun et al. | |
| 2008/0207176 A1 | 8/2008 | Brackbill et al. | |
| 2008/0270938 A1 | 10/2008 | Carlson | |
| 2008/0306826 A1 | 12/2008 | Kramer et al. | |
| 2008/0313346 A1 | 12/2008 | Kujawa et al. | |
| 2009/0042588 A1 | 2/2009 | Lottin et al. | |
| 2009/0132453 A1 | 5/2009 | Hangartner et al. | |
| 2010/0082427 A1 | 4/2010 | Burgener et al. | |
| 2010/0131880 A1 | 5/2010 | Lee et al. | |
| 2010/0185665 A1 | 7/2010 | Horn et al. | |
| 2010/0262658 A1 | 10/2010 | Mesnage | |
| 2010/0306669 A1 | 12/2010 | Della Pasqua | |
| 2011/0099507 A1 | 4/2011 | Nesladek et al. | |
| 2011/0145564 A1 | 6/2011 | Moshir et al. | |
| 2011/0202598 A1 | 8/2011 | Evans et al. | |
| 2011/0213845 A1 | 9/2011 | Logan et al. | |
| 2011/0286586 A1 | 11/2011 | Saylor et al. | |
| 2011/0320373 A1 | 12/2011 | Lee et al. | |
| 2012/0028659 A1 | 2/2012 | Whitney et al. | |
| 2012/0184248 A1 | 7/2012 | Speede | |
| 2012/0209921 A1 | 8/2012 | Adafin et al. | |
| 2012/0209924 A1 | 8/2012 | Evans et al. | |
| 2012/0254325 A1 | 10/2012 | Majeti et al. | |
| 2012/0278692 A1 | 11/2012 | Shi | |
| 2012/0304080 A1 | 11/2012 | Wormald et al. | |
| 2013/0071093 A1 | 3/2013 | Hanks et al. | |
| 2013/0194301 A1 | 8/2013 | Robbins et al. | |
| 2013/0290443 A1 | 10/2013 | Collins et al. | |
| 2014/0032682 A1 | 1/2014 | Prado et al. | |

(56) References Cited

U.S. PATENT DOCUMENTS

| | | | |
|---|---|---|---|
| 2014/0122787 A1 | 5/2014 | Shalvi et al. |
| 2014/0201527 A1 | 7/2014 | Krivorot |
| 2014/0282096 A1 | 9/2014 | Rubinstein et al. |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0199082 A1 | 7/2015 | Scholler et al. |
| 2015/0227602 A1 | 8/2015 | Ramu et al. |
| 2015/0370455 A1 | 12/2015 | Van Os et al. |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0180887 A1 | 6/2016 | Sehn |
| 2016/0277419 A1 | 9/2016 | Allen et al. |
| 2016/0321708 A1 | 11/2016 | Sehn |
| 2016/0359957 A1 | 12/2016 | Laliberte |
| 2016/0359987 A1 | 12/2016 | Laliberte |
| 2017/0161382 A1 | 6/2017 | Ouimet et al. |
| 2017/0221272 A1 | 8/2017 | Li et al. |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |
| 2017/0374003 A1 | 12/2017 | Allen et al. |
| 2017/0374508 A1 | 12/2017 | Davis et al. |
| 2018/0364872 A1 | 12/2018 | Miura et al. |
| 2019/0354264 A1 | 11/2019 | Van Os et al. |
| 2020/0073888 A1 | 3/2020 | Fleischman et al. |
| 2021/0367914 A1 | 11/2021 | Collins et al. |
| 2022/0021552 A1* | 1/2022 | Ansari ................ H04L 63/20 |
| 2023/0412664 A1* | 12/2023 | Chegini .............. G06Q 10/06 |

FOREIGN PATENT DOCUMENTS

| | | |
|---|---|---|
| CN | 107710772 A | 2/2018 |
| CN | 108573070 A | 9/2018 |
| CN | 115668888 A | 1/2023 |
| CN | 107688587 B | 2/2023 |
| KR | 101865875 B1 | 7/2018 |
| WO | WO-2012000107 A1 | 1/2012 |
| WO | WO-2012056326 A2 | 5/2012 |
| WO | WO-2013008251 A2 | 1/2013 |
| WO | WO-2014194262 A2 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016/112299 A1 | 7/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |
| WO | 2019171128 | 9/2019 |
| WO | 2021237088 | 11/2021 |
| WO | WO-2021237088 A1 | 11/2021 |

OTHER PUBLICATIONS

"U.S. Appl. No. 16/880,396, Final Office Action mailed Jan. 3, 2023", 19 pgs.
"U.S. Appl. No. 16/880,396, Non Final Office Action mailed Apr. 13, 2023", 23 pgs.
"U.S. Appl. No. 16/880,396, Non Final Office Action mailed Jun. 6, 2022", 13 pgs.
"U.S. Appl. No. 16/880,396, Non Final Office Action mailed Nov. 26, 2021", 13 pgs.
"U.S. Appl. No. 16/880,396, Notice of Allowance mailed Aug. 3, 2023", 9 pgs.
"U.S. Appl. No. 16/880,396, Response filed Feb. 28, 2022 to Non Final Office Action mailed Nov. 26, 2021", 9 pgs.
"U.S. Appl. No. 16/880,396, Response filed Apr. 3, 2023 to Final Office Action mailed Jan. 3, 2023", 10 pgs.
"U.S. Appl. No. 16/880,396, Response filed Jul. 13, 2023 to Non Final Office Action mailed Apr. 13, 2023", 9 pgs.
"U.S. Appl. No. 16/880,396, Response filed Sep. 6, 2022 to Non Final Office Action mailed Jun. 6, 2022", 9 pgs.
"International Application Serial No. PCT/US2021/033650, International Preliminary Report on Patentability mailed Dec. 1, 2022", 6 pgs.
"International Application Serial No. PCT/US2021/033650, International Search Report mailed Sep. 16, 2021", 3 pgs.
"International Application Serial No. PCT/US2021/033650, Written Opinion mailed Sep. 16, 2021", 4 pgs.
Castelluccia, Claude, et al., "EphPub: Toward robust Ephemeral Publishing", 19TH IEEE International Conference on Network Protocols (ICNP), (Oct. 17, 2011), 18 pgs.
Fajman, "An Extensible Message Format for Message Disposition Notifications", Request for Comments: 2298, National Institutes of Health, (Mar. 1998), 28 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.
Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.
Shein, Esther, "Ephemeral Data", Communications of the ACM, vol. 56, No. 9, (Sep. 2013), 3 pgs.
Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.
U.S. Appl. No. 16/880,396, filed May 21, 2020, Featured Content Collection Interface.
"Chinese Application Serial No. 202180036918.X, Office Action mailed May 31, 2024", w/ English translation, 19 pgs.
"European Application Serial No. 21808109.9, Extended European Search Report mailed May 21, 2024", 7 pgs.
"Chinese Application Serial No. 202180036918.X, Office Action mailed Nov. 29, 2024", w/ English translation, 14 pgs.
"Chinese Application Serial No. 202180036918.X, Response filed Sep. 27, 2024 to Office Action mailed May 31, 2024", w/ current English claims, 13 pgs.

* cited by examiner

CONTENT COLLECTION INTERFACE

PRIORITY CLAIM

This application claims the benefit of U.S. patent application Ser. No. 16/880,396, filed on May 21, 2020, which is hereby incorporated by reference in its entirety.

BACKGROUND

Social media sharing platforms allow users to share millions of messages between mobile devices within a social network environment. Users the social network can share media content, such as audio, images, and video between their perspective user devices (e.g., mobile devices, personal computers). The social media sharing platforms may further allow users capture and share images and pictures with other users by exchanging text messages.

The popularity of mobile based social networking systems continues to grow, users increasingly share media content items, such as images, pictures, and video with each other. These media content items encourage electronic visual communication on a global scale.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

As users in social networking systems capture and store media content items on their mobile computing devices, it becomes increasingly difficult to present the most prevalent or important types of media content items on an interactive platform based on certain criteria. For instance, when users in a social networking application access media content items, it is typically presented in a gallery-type interface arranged by date and time.

However, media content items are more complexed in technical structure and are embedded with sophisticated two-dimensional and three-dimensional graphics, advance level digital composition, and compounded metadata. Current social networking systems are unable to present featured media content items to the user containing these digital complexities in a robust and efficient interface.

In at least one example of the present disclosure, a system is provided that generates an interactive media content interface made up of collection of featured media content items containing images, pictures, videos, augmented reality (AR) transformations, AR images, image component overlays, and other associated metadata. The system can access the media content items from eligible users in a social networking system and generate a sequenced content collection interface, also known as a featured content collection interface, based on certain criteria, such as, the amount of media content items saved by the user during a certain period of time, the amount of contacts the users has stored in their contact database, or the amount of media content items captured and saved by the user that contain an AR transformation, AR image, or image component overlay. The system also considers other logic or criteria, such as media content items that were recently stored media content items, or media content items captured during a certain time range, e.g., the first 7 days or the first 30 days.

Networked Computing Environment

Figure 1:
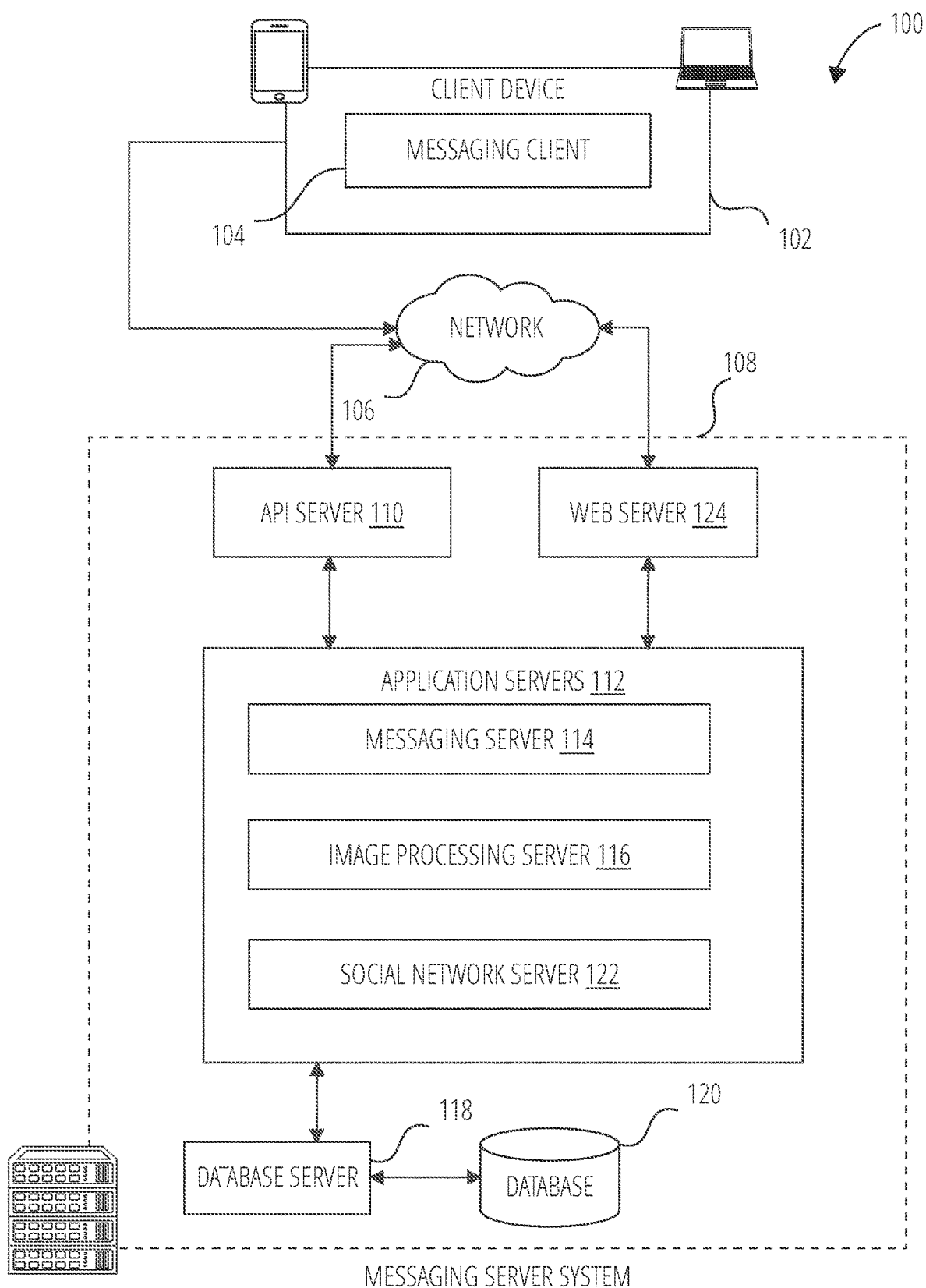
FIG. 1 is a diagrammatic representation of a networked environment in which the present disclosure may be deployed, in accordance with some examples.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
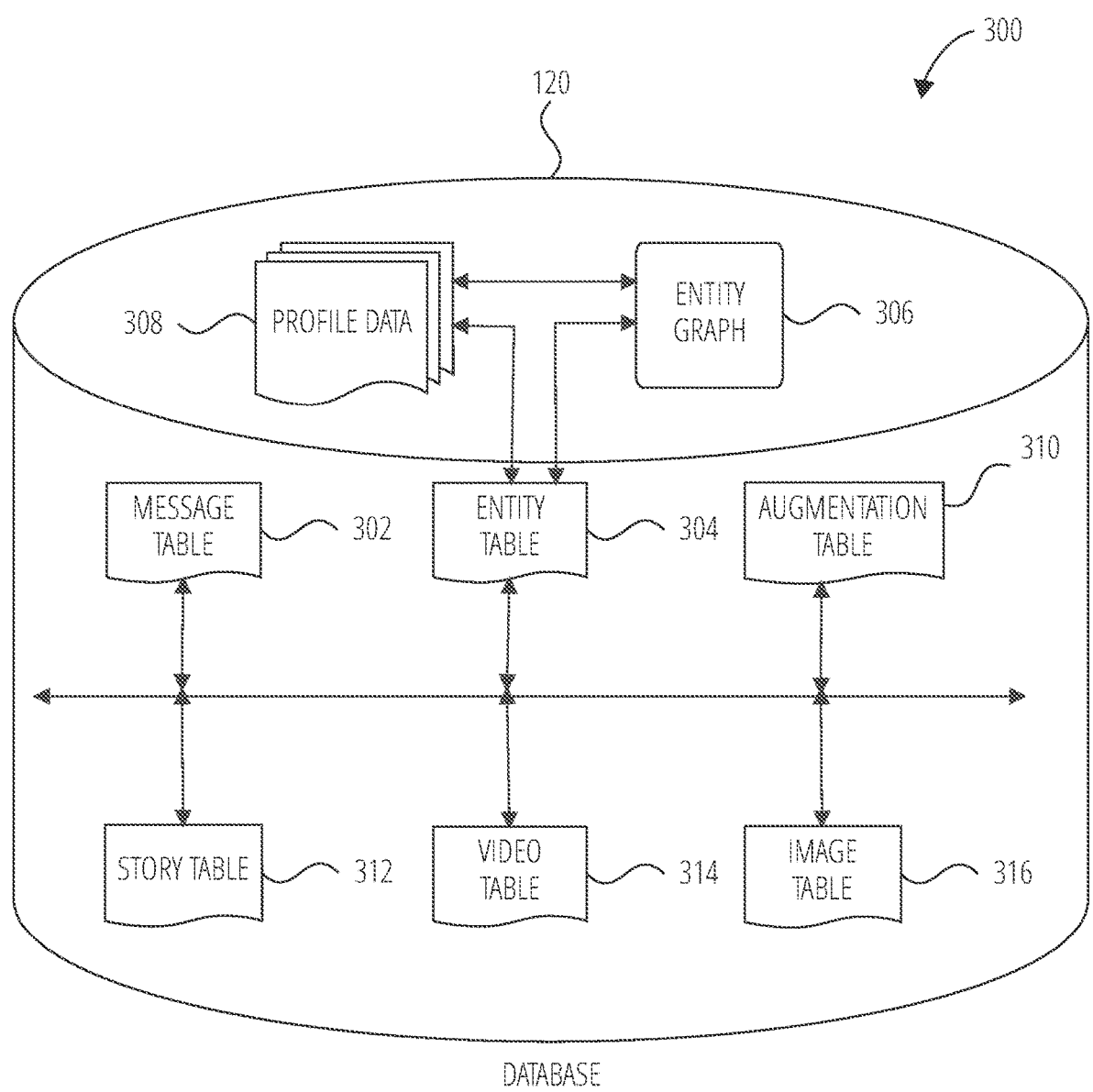
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

System Architecture

Figure 2:
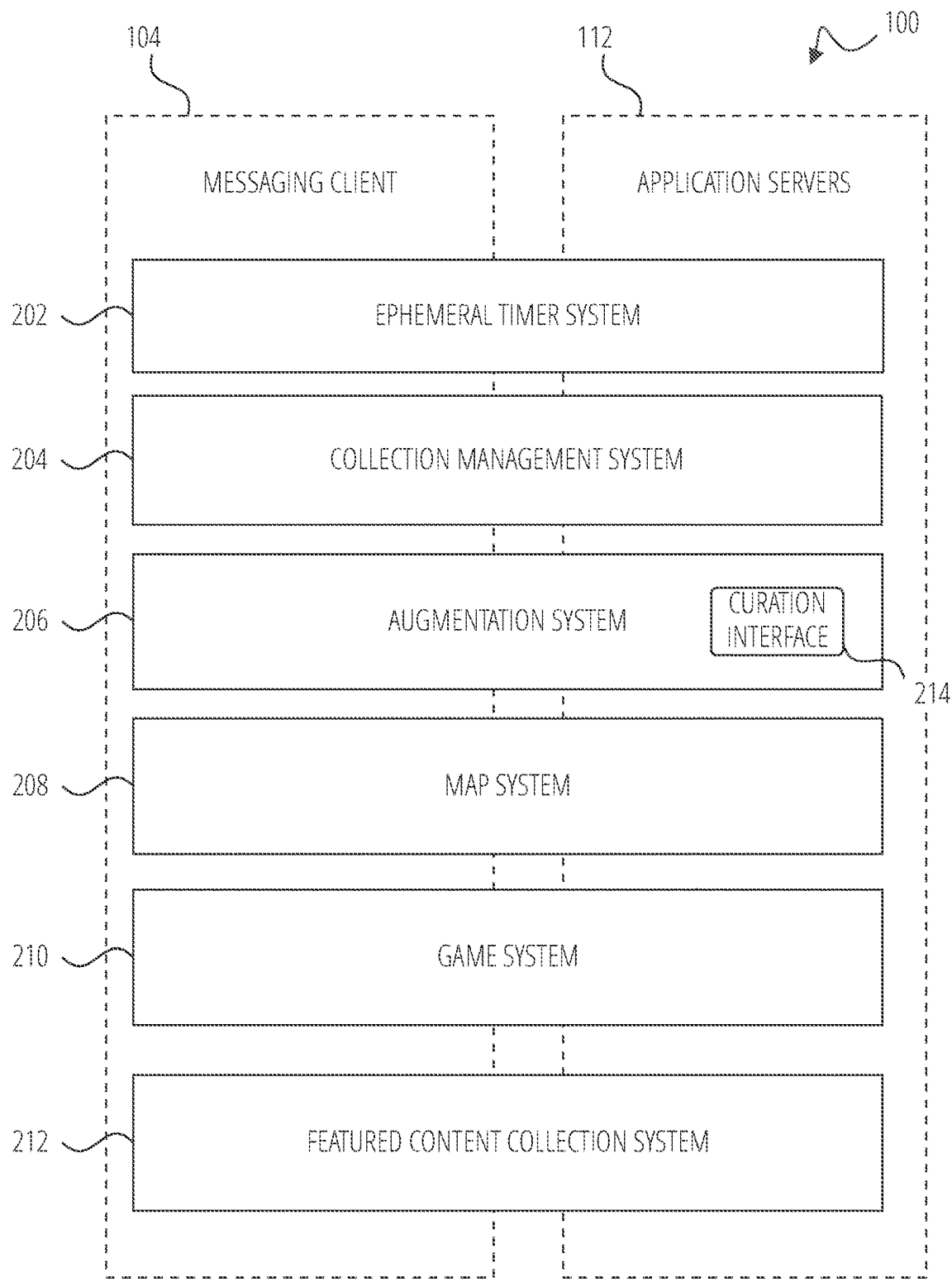
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the sever-side by the application servers 112. These subsystems include, for example, an ephemeral timer system 202, a collection management system 204, an augmentation system 206, a map system 208, a game system 210 and a featured content collection system 212.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 214 that allows a collection manager to manage and curate a particular collection of content. For example, the curation interface 214 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The featured content collection system 212 executes functions, routines, and operations including receiving a plurality of media content items from the client device 102, or a third party social network server. The plurality of media content items can also be accessed from database 120, identifying first and second subsets of media content items based characteristics. In one example, the characteristics include augmented reality transformations, image overlays, augment reality experiences, or augment reality images. Other characteristics include information, data, and images accessed from the collection management system 204, augmentation system 206, map system 208, game system 210, profile data 308 stored in database 120, message information stored in message table 302, entity information stored in the entity graph 306 of the database 120, and augmentation data information stored in the augmentation table 310. The featured content collection system 212 includes extensive processing instructions for generating a first sequenced content collection, which include the first and second subsets (explained in detail below) and causing a first content collection interface to be displayed by the client device 102 or another computing device.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a username, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, augmented reality media content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client application 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Data Communications Architecture

Figure 4:
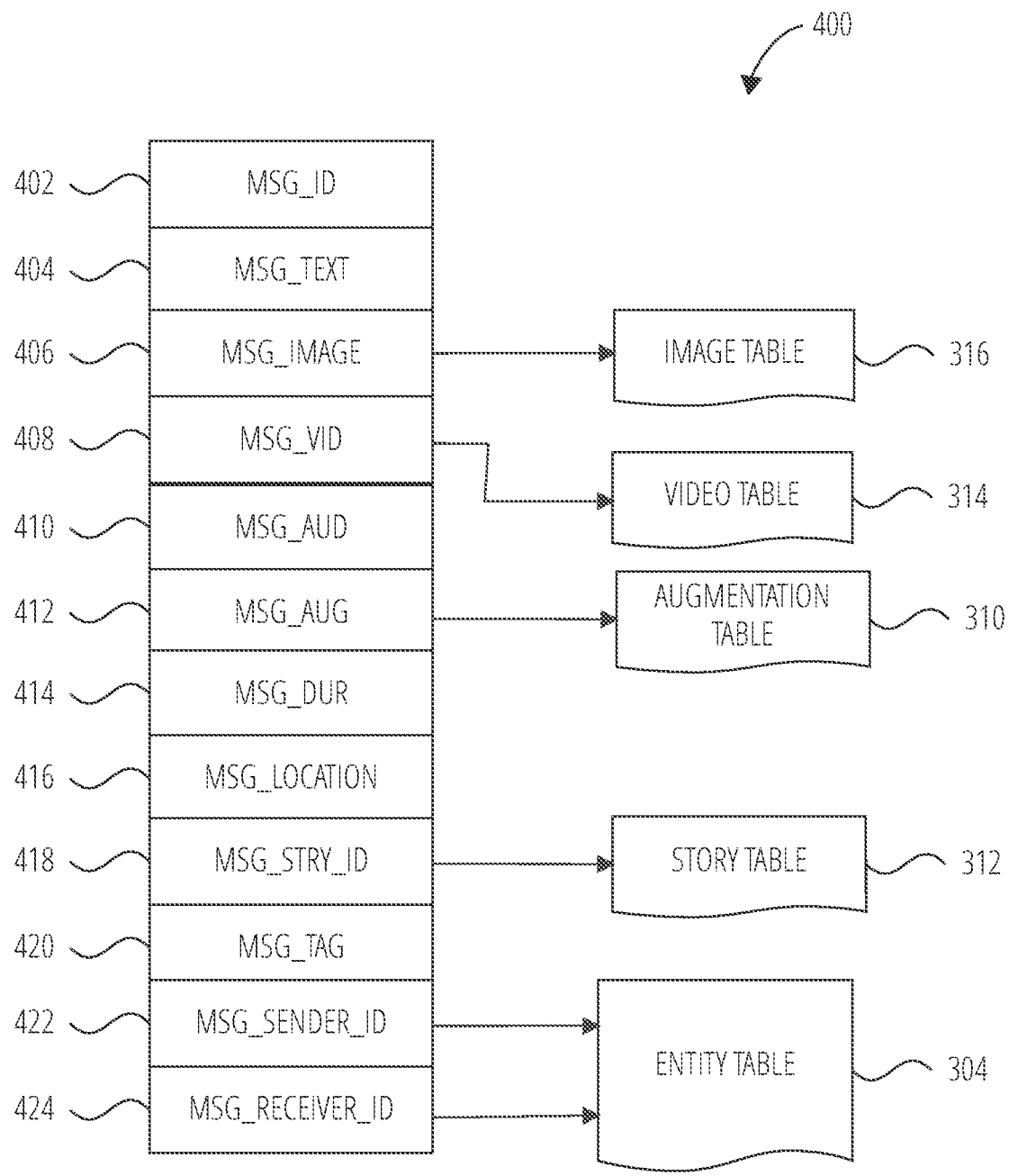
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 316.
- message video payload 408: video data, captured by a camera component or retrieved from a memory component of the client device 102, and that is included in the message 400. Video data for a sent or received message 400 may be stored in the video table 314.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the Client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Time-Based Access Limitation Architecture

Figure 5:
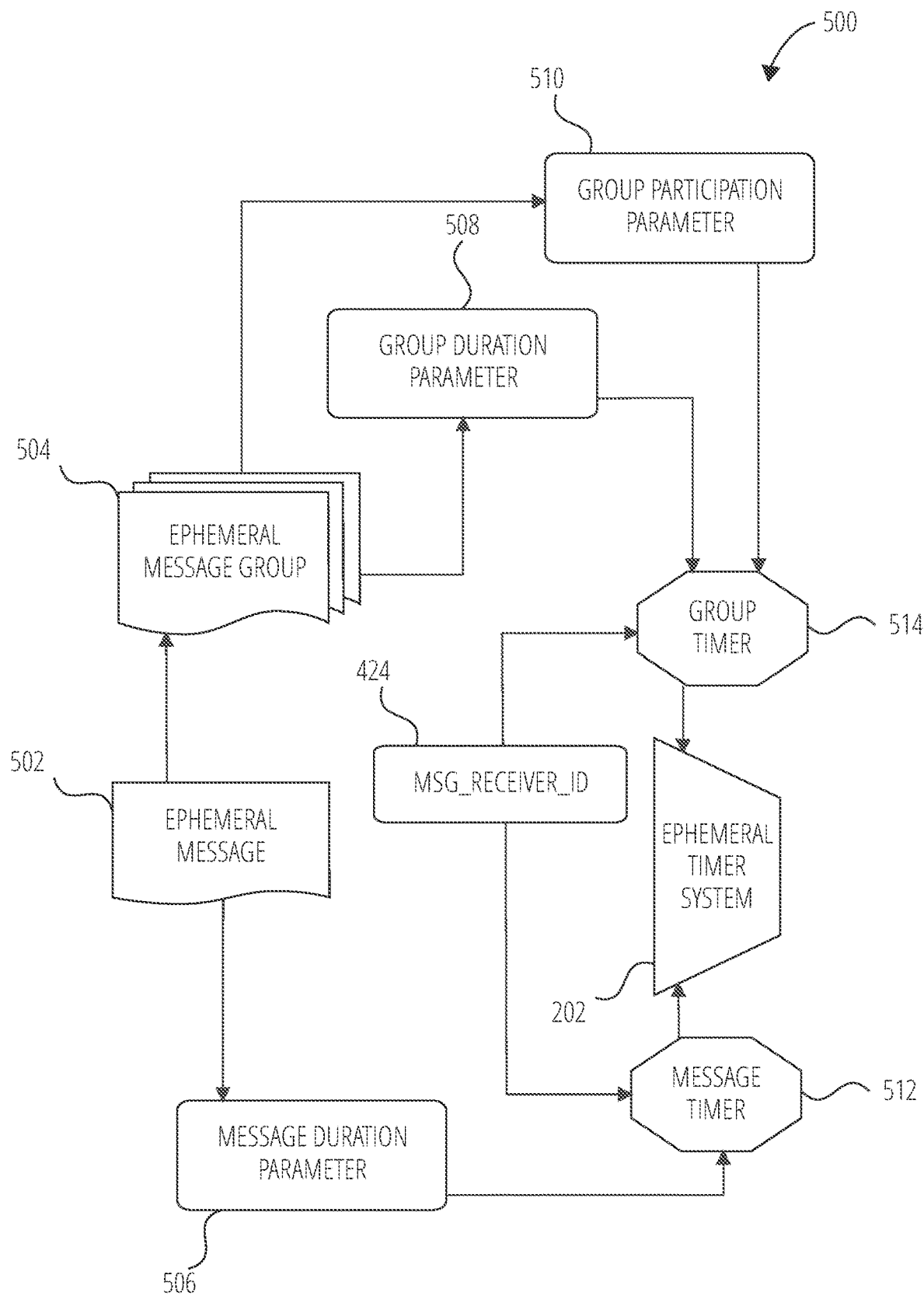
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Figure 6:
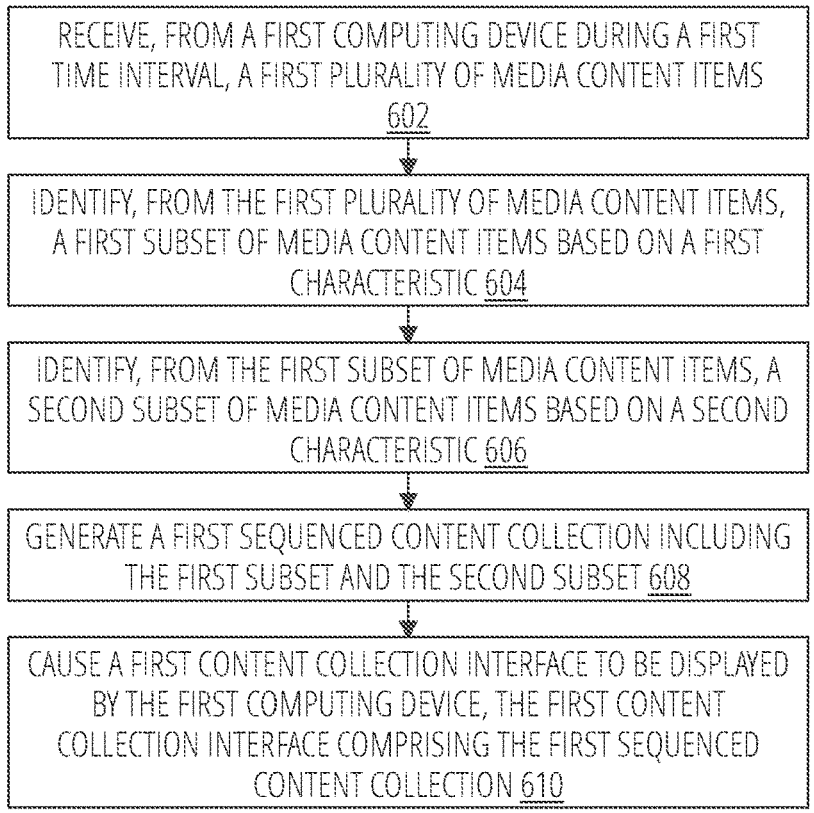
FIG. 6 illustrates a flowchart for generating a featured content collection in accordance with one embodiment.

FIG. 6 illustrates a flowchart for generating a featured content collection in accordance with one embodiment. The operations of methods in FIG. 6 may be performed by any number of different systems, such as the systems described herein, or any portion thereof, such as a processor included in any of the systems.

In operation 602, a processor of a computing device (e.g., client device 102 or server-side computing device such as application servers 112) receives, from a first computing device during a first time interval, a first plurality of media content items. The first time interval is a predetermined time period set by the user of the client device 102 or synchronized with the client device 102, messaging server system 108, or third party network device. In one example, the first time interval can be a date range based on the creation date of media content items by the first computing device or a day, month, and year metric established by the messaging server system 108. In some examples, an online social network system, such as the messaging server 114, account generation period measures the day, month and year metric. The first time interval can also be based on a creation date associated with each of the plurality of media content items being generated by the first computing device, respectively.

In one example, and as explained above, the media content items are ephemeral, and can be at least one video, at least one image, at least one photograph, at least one augmented reality (AR) image transformation, augmented reality content items, AR media content item, or at least one three-dimensional object. Although a first time interval is disclosed, the system can also receive a plurality of time intervals including a first time interval, a second time interval, a third time interval, a fourth time interval etc. For instance, the second time interval is also a predetermined time period set by the user of the client device 102 or synchronized with the client device 102, messaging server system 108, or third party network device, or a date range based on the creation date of media content items or a day, month, and year metric established by the messaging server system 108. The second time interval is greater than the first time interval.

The second time interval can also be based on a creation date associated with each of the plurality of media content items being generated by the first computing device. In one example, and as explained above, the media content items are ephemeral, and can be at least one video, at least one image, at least one photograph, at least one augmented reality (AR) image transformation, AR media content item, or at least one three-dimensional object.

In operation 604, the processor identifies, from the first plurality of media content items, a first subset of media content items based on a first characteristic. In one example, the first subset of media content items can be two or more media content items aggregated into a group, subgroup, or subset of media content items, each from the first plurality of media content items. In another example, the first characteristic is a digital feature, quality, or criteria related or applied to the media content items, such as, a three dimensional object applied to the media content items, an image overlay overlaid on top of the media content items, an augmented reality content items, image overlay component overlaid on top of the media content items, an AR transformation image associated with or applied to the media content items, caption textual data applied to the media content items, an amount of media content items stored at the computing device, or an augmented reality image transformation applied to the media content items in the first subset of media content items.

In another example, the first characteristic is eligible user criteria based on a user associated with the computing device. The eligible user criteria is logic that defines what type of media content items are identified. The first characteristic corresponds to the amount of user activity accumulated during use of the social networking application during a time frame (month-date-year), the number of media content items stored in a computing device associated with the user, and the amount of media content generated and stored at the computing device.

In another example, the first characteristic is logic based on whether an augmented reality image transformation has been applied to the media content item, whether the media content item has been accessed or opened at the computing device, whether an image overlay has been overlaid on top of a media content item, whether a location associated with the computing device has been added to the media content item, the amount of contacts stored at the computing device, or an overall activity level of the computing device. The predetermined time frame can be any time period in which an amount of user contacts has been downloaded into the computing device database of the user, the amount of media content items or content collections stored during a time frame determined by the user, computing device, or third-party application 1240.

In block 606, the processor identifies, from the first subset of media content items, a second subset of media content items based on a second characteristic. The second characteristic is a digital feature, quality, or criteria related to or applied to the media content items, such as, a three dimensional object associated with or applied to the media content items, an image overlay overlaid on top of the media content items, image overlay component overlaid on top of the media content items, an AR transformation image associated with or applied to the media content items, caption textual data applied to the media content items.

In one example, the second subset is eligible user criteria based on a user associated with the computing device. The eligible user criteria is logic that defines what type of media content items are identified. The second characteristic, in another example, is an amount of user activity accumulated during use of the social networking application during a time frame (month-date-year), the number of media content items stored in a computing device associated with the user, the amount of contacts stored at the computing device, or an overall activity level of the computing device.

In another example, an algorithmic determination associated with the second characteristic can be executed to determine whether an augmented reality image transformation has been applied to the media content item, whether an image overlay has been overlaid on top of a media content item, or whether a location associated with the computing device has been added to the media content item. The second subset of media content items based on the second characteristics may also include media content items that are an image overlay components.

In another example, the computing device determines whether a predetermined amount of media content items is saved at the computing device. The predetermined amount of media content items can be set by the user or stored in memory 1104. In one example, the computing device can execute the operation of receiving a first, second, third, fourth or fifth plurality of media content items and identifying a first subset, second subset, third subset, fourth subset, or fifth subset of media content items based on the first or second characteristics.

Figure 7:
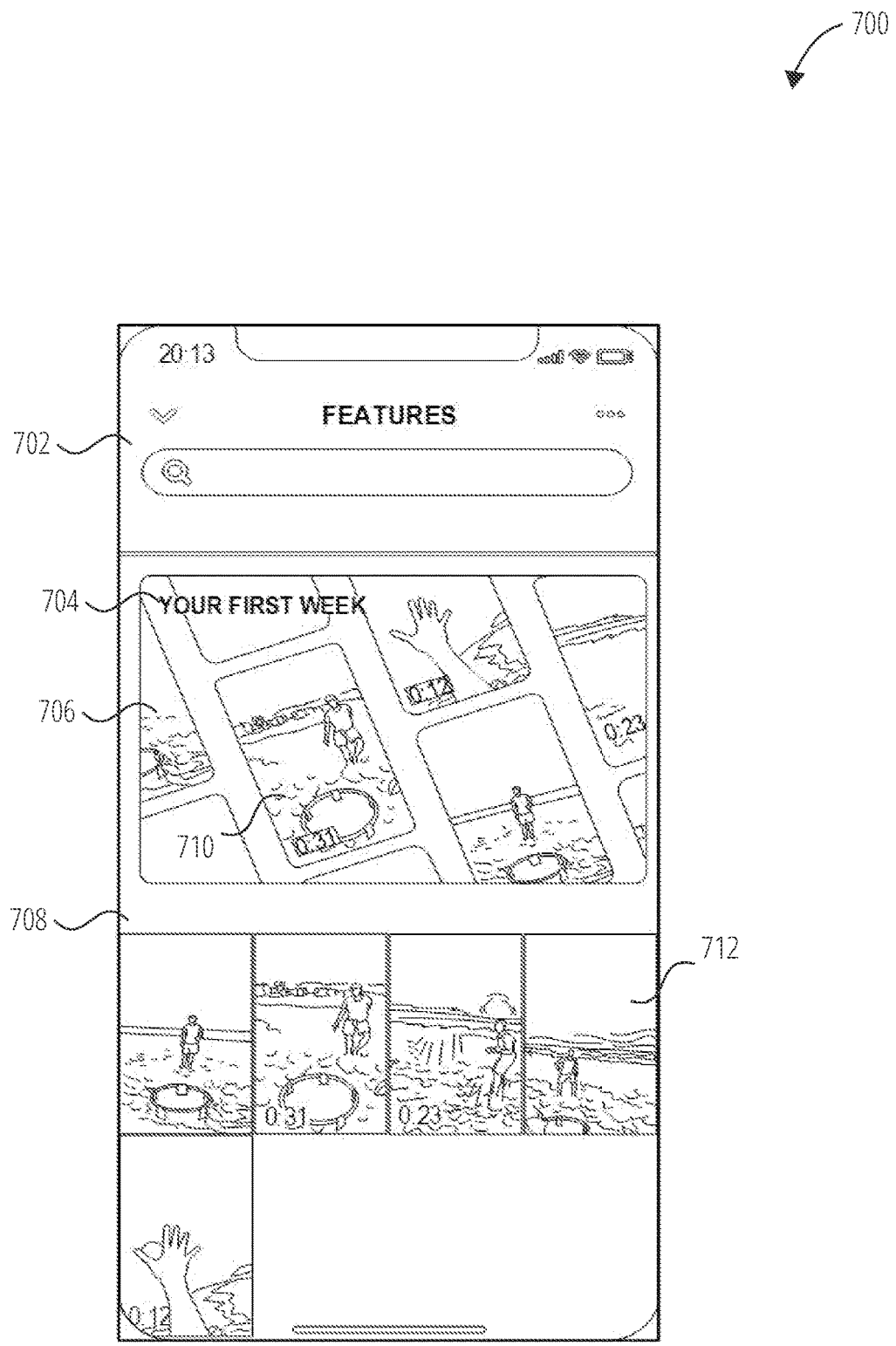
FIG. 7 illustrates an example of a user interface of a featured content collection in accordance with one embodiment.

In operation 608, the processor generates a first sequenced content collection including the first subset and the second subset. The first sequence content collection is an interactive interface that includes a collection of media content items of the identified first subset media content items and the identified second subset media content items. In one example, the first sequence content collection can arrange each of the media content items in polygonal array, circular array, or interactive media content item arrangement as shown in FIG. 7.

The media content items can be arranged according to a sequence of eligible user criteria or first and second characteristics as described above. In another example, as the processor of the computing device generates media content items in real time, the computing device identifies whether a first or second characteristic in applied to the newly generated media content items, and if the media content item includes a matching first or second characteristic, the computing devices associates the media content item with the first sequenced content collection or stores the media content item in memory of the computing device.

In another example, the processor generates a notification overlay associated with the first content collection interface and transmits the notification overlay to the first computing device after the first sequence content collection is generated. The notification overlay can be executed as a push notification and image overlay that is overlaid on top of a media content item within the first sequence content collection alerting the user of the computing device that the first content collection interface is completed and ready to be viewed. The notification overlay is transmitted to the first computing device, another computing device within the social network application, or a third party application associated with a computing device at a time interval based on a user defined day, month, and year intervals. For instance, the notification overlay can be set to the computing device on key initial days, such as day 1, day 8, day 31, or day 90.

In another example, a title variant is generated that is overlaid on top of the sequenced content collection. The title variant includes a textual caption or textual alpha-numeric string of characters describing the media content item or associated first characteristic and second characteristic. In another example, the title variant also describes the media content item and associated first characteristic and second characteristic. In operation 610, the processor causes a first content collection interface to be displayed by the first computing device. The first content collection interface can comprise the first sequenced content collection.

FIG. 7 illustrates an example of a user interface of a featured content collection in accordance with one embodiment. The user interface 700, also referred to as a first content collection interface 700, is generated at the first computing device and includes the first sequenced content collection 706. The first content collection interface 700 includes a search field 702, a title variant 704, the first sequenced content collection 706 and recently added content collections 708. In one example, a user can input a search query into the search field 702 corresponds to a descriptive alpha-numeric characters relating to stored media content items.

The user can also input an image overlay into the search field 702 for access to associated media content items. The title variant 704 is overlaid on top of the sequenced content collection. For example, the title variant states, "Your First Week". The title variant, in another example, includes a textual caption or textual alpha-numeric string of characters describing the media content item or associated first characteristic and second characteristic which can include any related string of informative titles, such as "Your First 30 days", "Your last Month" or "Your Christmas Vacation."

Still referring to FIG. 7, the first sequenced content collection 706 displays media content items 710 in a sequential diagonal polygonal arrangement based on the amount of stored media content items during the first 7 days of activity (e.g., generating media content items) in the social network application. For instance, the media content items 710 are displayed in the first sequenced content collection 706. The media content items 710 correspond to a first characteristic, which in this example, corresponds to an amount of media content items generated in the first seven days of activity on the social network application of the computing device.

In one example, upon applying a user gesture, such as pressing a finger and physically scrolling up or down on the display, the remaining media content items 710 arranged in the first sequenced content collection 706 are displayed. The recently added content collections 708 are arranged in a separate section of the first content collection interface 700. In one example, the added content collections 708 include media content items 712 that were captured or generated in real-time by the computing device. In another example, the added content collections 708 were captured or generated at a time after the generation of the first sequenced content collection 704.

Figure 8:
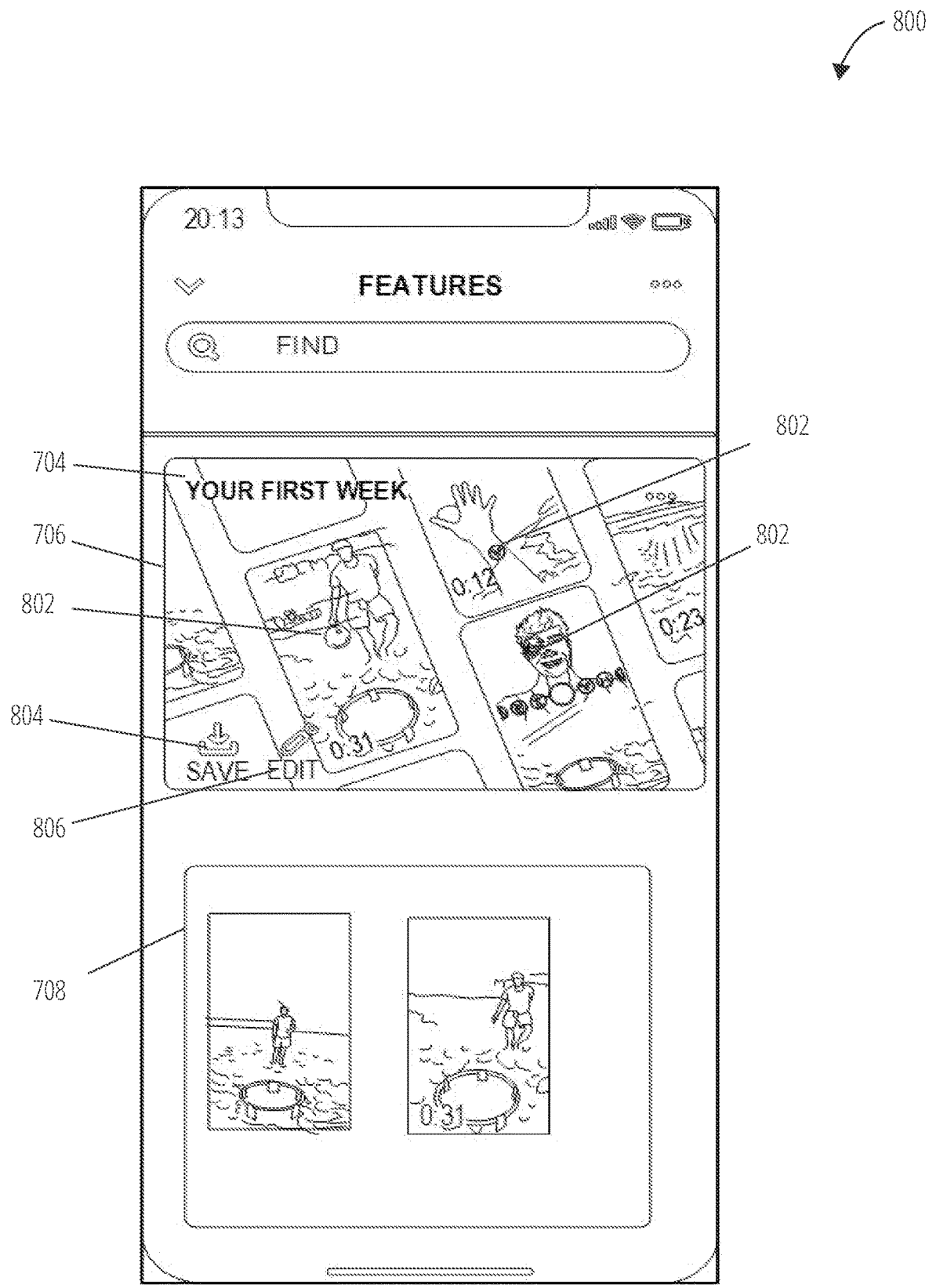
FIG. 8 illustrates an example of a user interface of a feature content collection with augmented reality image transformation in accordance with one embodiment.

FIG. 8 illustrates an example of a user interface of a feature content collection with augmented reality image transformation in accordance with one embodiment. As shown in user interface 800, the title variant 704 is overlaid on top of the first sequenced content collection 706 and states, for example, "Your First Week". The media content items 802 depict identified second characteristics that include augmented reality (AR) media content items 802, e.g., augmented reality image transformations, that are applied to the media content items 802.

In one example, the augmented reality image transformations applied to the media content items 802 are real-time special effect and sound that may be added to an image, video, or media content item. In another example, the augmented reality image transformations applied to the media content items 802 are images, models, and textures used to create transformations in content, as well as to additional modeling and analysis information applied to achieve such transformations with object detection, tracking, and placement.

As shown in FIG. 8, the augmented reality image transformation, also referred to as an augmented reality content item, is applied to the media content item 802. The media content items 802 include augmented reality media transformations and correspond to the second subset of media content items based on a second characteristic. In another example, the augmented reality media transformations in media content items 802 are based on a second characteristic. For illustration purposes, in one example, the second characteristic corresponds to the augmented reality image transformation depicted in media content item 802.

An overlay save icon 804 and overlay edit icon 806 are overlaid on top of the first sequenced content collection 706. In one example, the overlay save icon 804 stores the first sequenced content collection 706 and associated media content items 802 at one of the storage tables in database 120. the first sequenced content collection 706 and associated media content items 802 are stored upon a user of the computing device applying a user gesture on the overlay save icon 804. In another example, the overlay edit icon 806 executes a modification function on the first sequenced content collection 706 and associated media content items 802 upon a user of the computing device applying a user gesture on the overlay edit icon 806.

Figure 9:
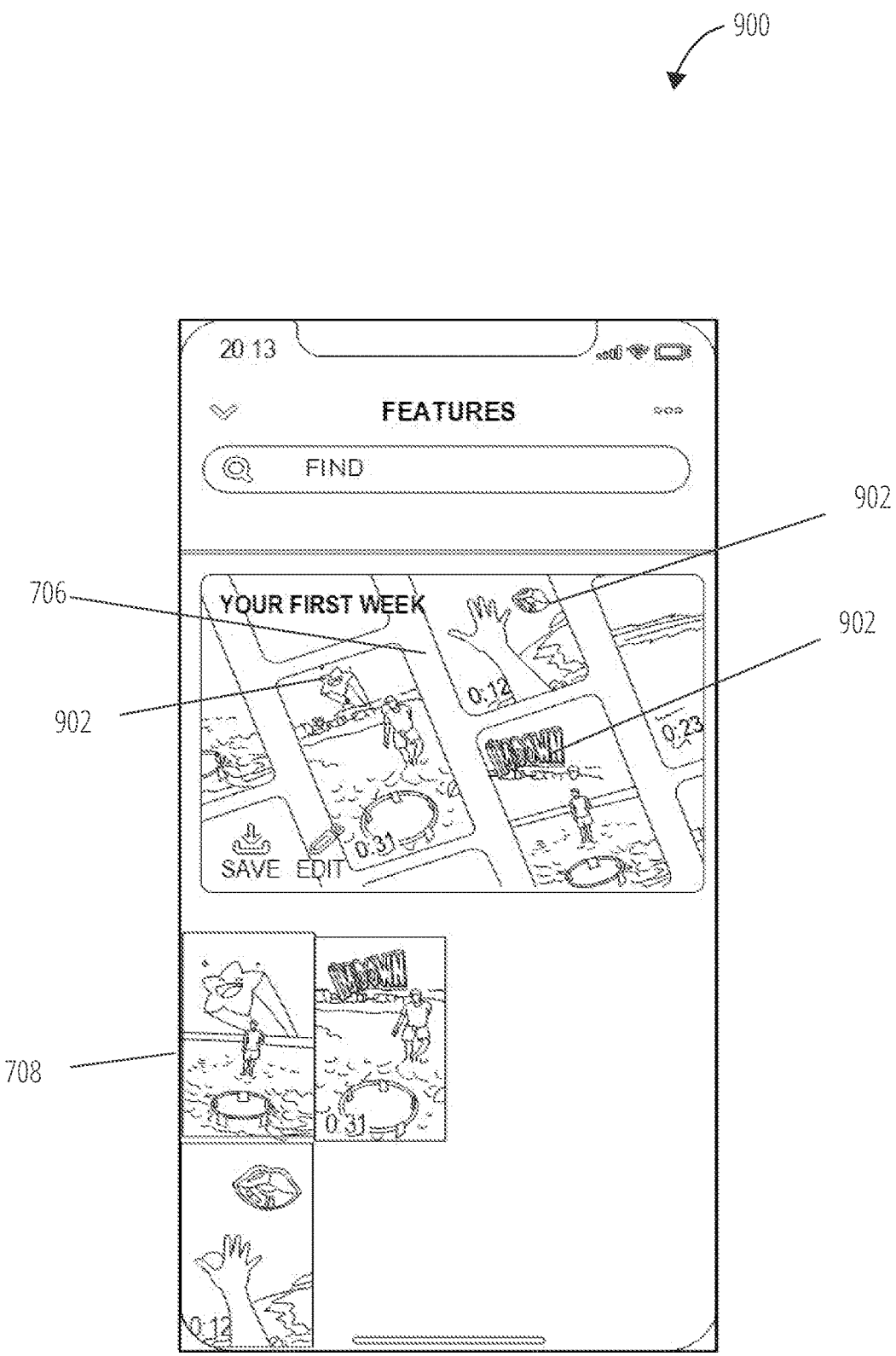
FIG. 9 illustrates an example of a user interface of a featured content collection with image overlay components in accordance with one embodiment.

FIG. 9 illustrates an example of a user interface of a featured content collection with image overlay components in accordance with one embodiment. As shown in FIG. 9, an image overlay component 902 is applied to the media content items 902 and correspond to the second subset of media content items based on a second characteristic. The image overlay component 902 is a graphic overlay icon, object, three-dimensional object, two-dimensional object, augmented reality image, video, or digital image that is overlaid on top of media content items. In one example, the image overlay components 902 that are depicted in FIG. 9, correspond to the second characteristic identified from the first subset of media content items 710.

An overlay save icon 804 and overlay edit icon 806 are overlaid on top of the first sequenced content collection 706. In one example, the overlay save icon 804 stores the first sequenced content collection 706 and associated media content items 802 at one of the storage tables in database 120. the first sequenced content collection 706 and associated media content items 802 are stored upon a user of the computing device applying a user gesture on the overlay save icon 804.

In another example, the overlay edit icon 806 executes a modification function on the first sequenced content collection 706 and associated media content items 802 upon a user of the computing device applying a user gesture on the overlay edit icon 806. The recently added content collections 708 are arranged in a separate section of the first content collection interface 700 and include additional image overlay components 902.

Figure 10:
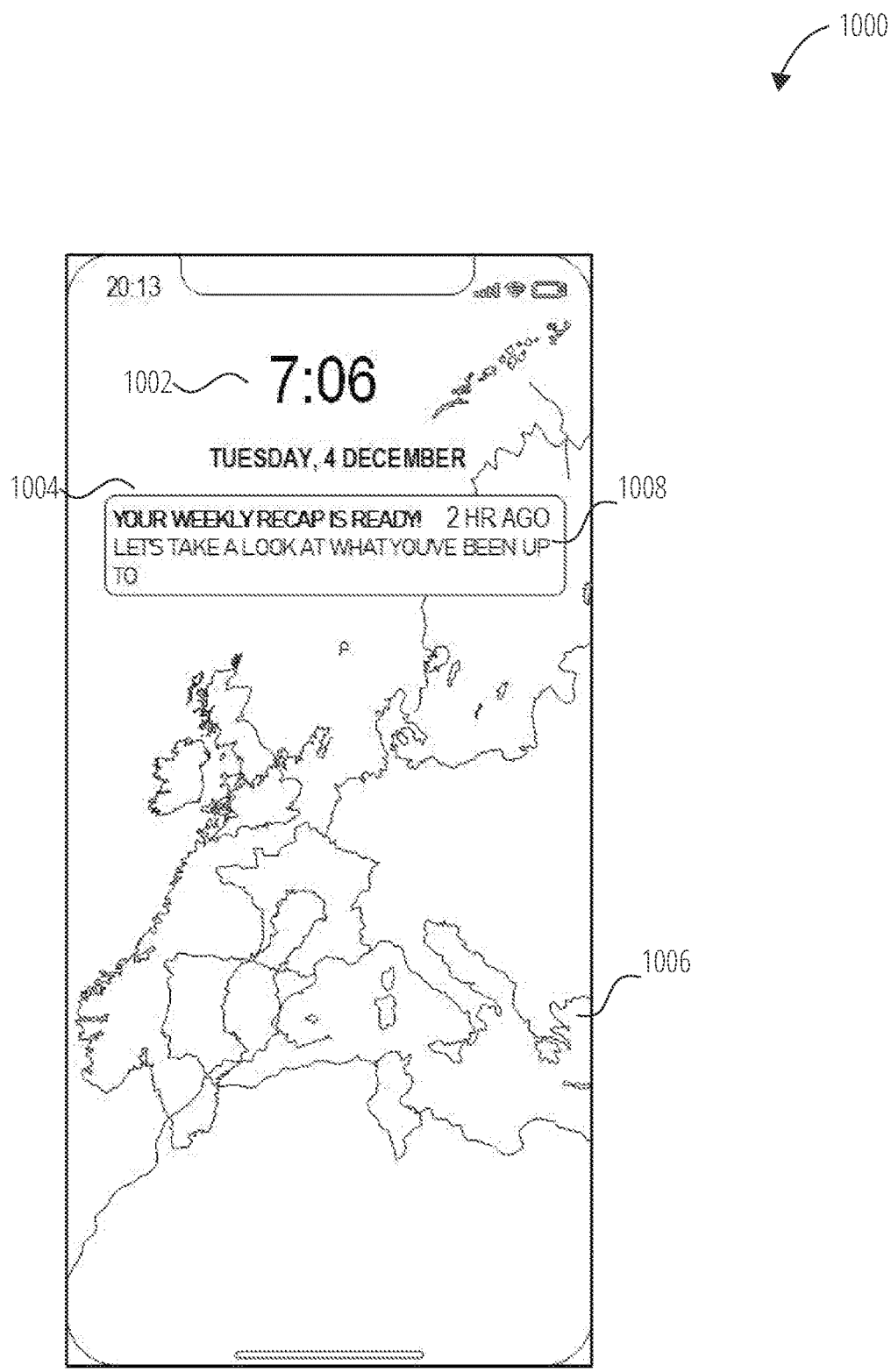
FIG. 10 illustrates an example of a user interface of a notification overlay in accordance with one embodiment.

FIG. 10 illustrates an example of a user interface of a notification overlay 1004 in accordance with one embodiment. As shown in FIG. 10, the user interface 1000 depicts a display time icon 1002, a notification overlay 1004, background image 1006, and alert message banner 1008. The display time icon 1002 displays, in real-time, the date and time directly associated with the computing device. The notification overlay 1004 is an image overlay that is overlaid on top of the background image 1006 and is associated with the first content collection interface. In one example, the notification overlay 1004 is transmitted to the first computing device after the first sequence content collection is generated.

In another example, the notification overlay 1004 can be a push notification that is displayed in order to alert the user of the computing device that the first content collection interface, which includes the first sequenced content collection, is completed and ready to be viewed. The notification overlay 1004 includes the alert message banner 1008 that displays an alpha-numeric string of characters. For example, the alpha-numeric string of characters displayed in the alert message banner 1008 states "Your Weekly Recap is ready! Let's take a look at what you've been up to." The notification overlay 1004 is overlaid on top of the background image 1008 when the computing device is in active use, stand-by mode, or at a scheduled period of time.

Machine Architecture

Figure 11:
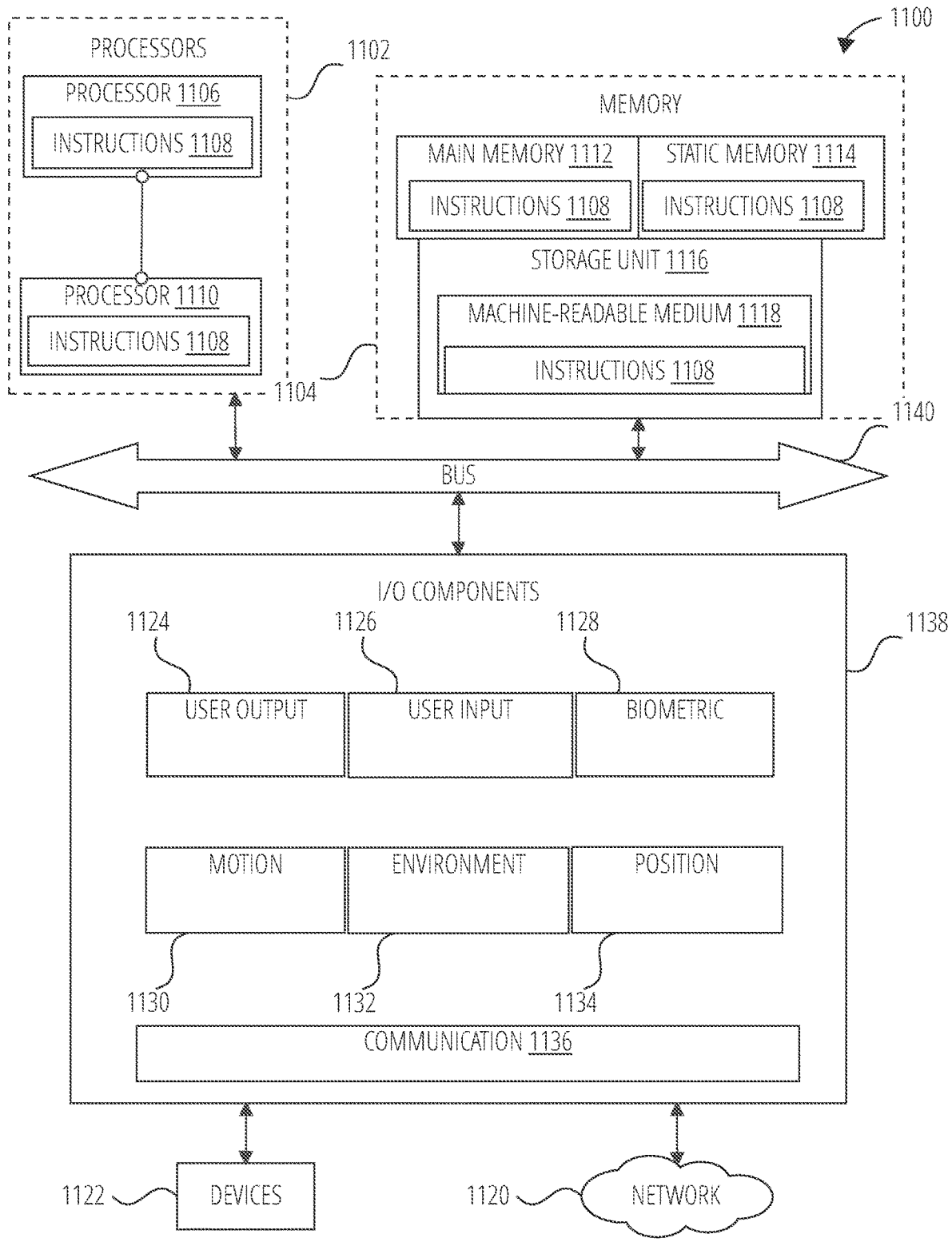
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1102, memory 1104, and input/output I/O components 638, which may be configured to communicate with each other via a bus 1140. In an example, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, both accessible to the processors 1102 via the bus 1140. The main memory 1104, the static memory 1114, and storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the processors 1102 (e.g., within the Processor's cache memory), or any suitable combination thereof, during execution thereof by the machine 1100.

The I/O components 1138 may include a wide variety of components to receive input, provide output, produce output, transmit information, exchange information, capture measurements, and so on. The specific I/O components 1138 that are included in a particular machine will depend on the type of machine. For example, portable machines such as mobile phones may include a touch input device or other such input mechanisms, while a headless server machine will likely not include such a touch input device. It will be appreciated that the I/O components 1138 may include many other components that are not shown in FIG. 11. In various examples, the I/O components 1138 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1138 further include communication components 1136 operable to couple the machine 1100 to a network 1120 or devices 1122 via respective coupling or connections. For example, the communication components 1136 may include a network interface Component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory of the processors 1102) and storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1136) and using any one of several well-known transfer protocols (e.g., hypertext transfer protocol (HTTP)). Similarly, the instructions 1108 may be transmitted or received using a transmission medium via a coupling (e.g., a peer-to-peer coupling) to the devices 1122.

Software Architecture

Figure 12:
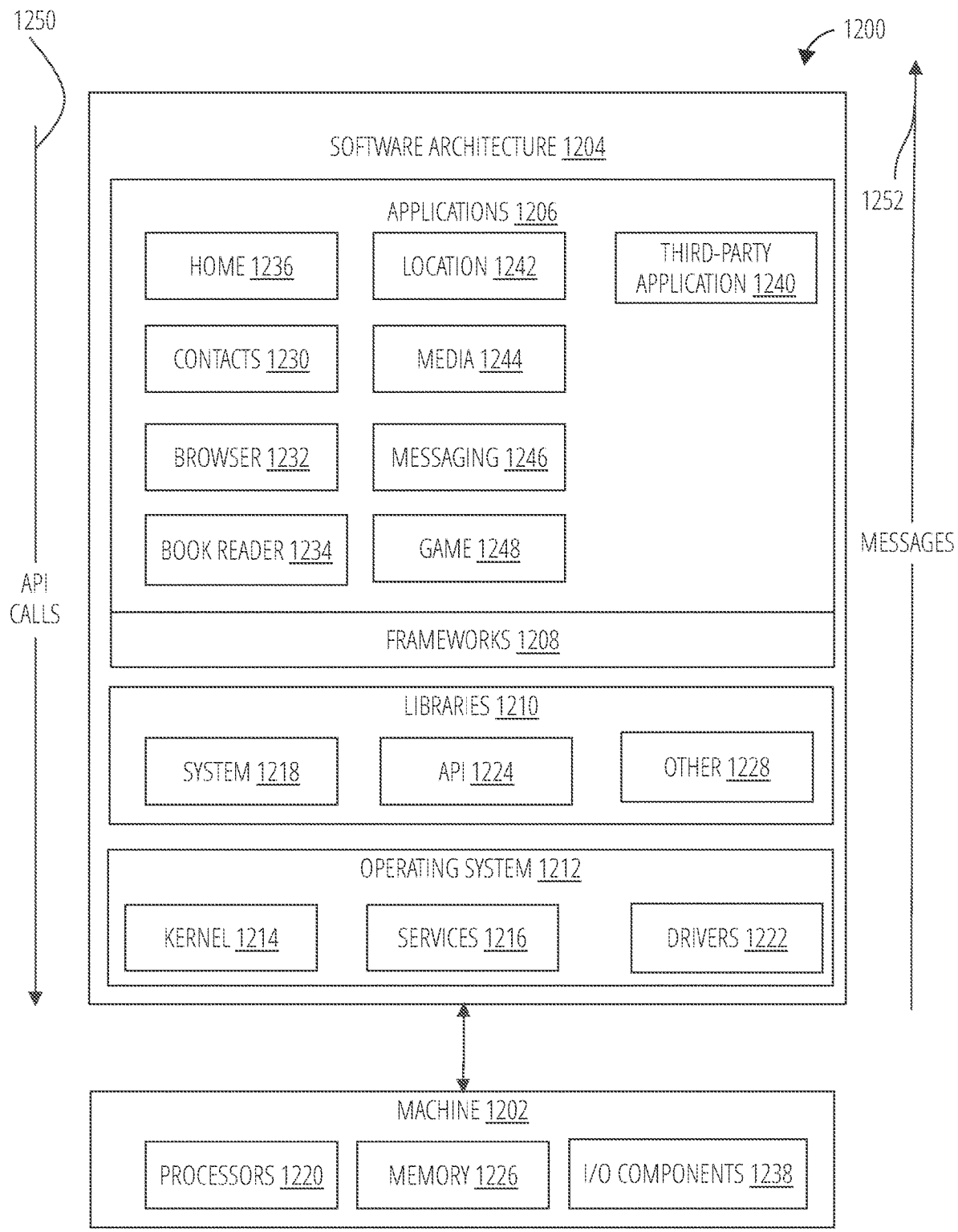
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as a third-party application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1240 can invoke the API calls 1250 provided by the operating system 1212 to facilitate functionality described herein.

Processing Components

Figure 13:
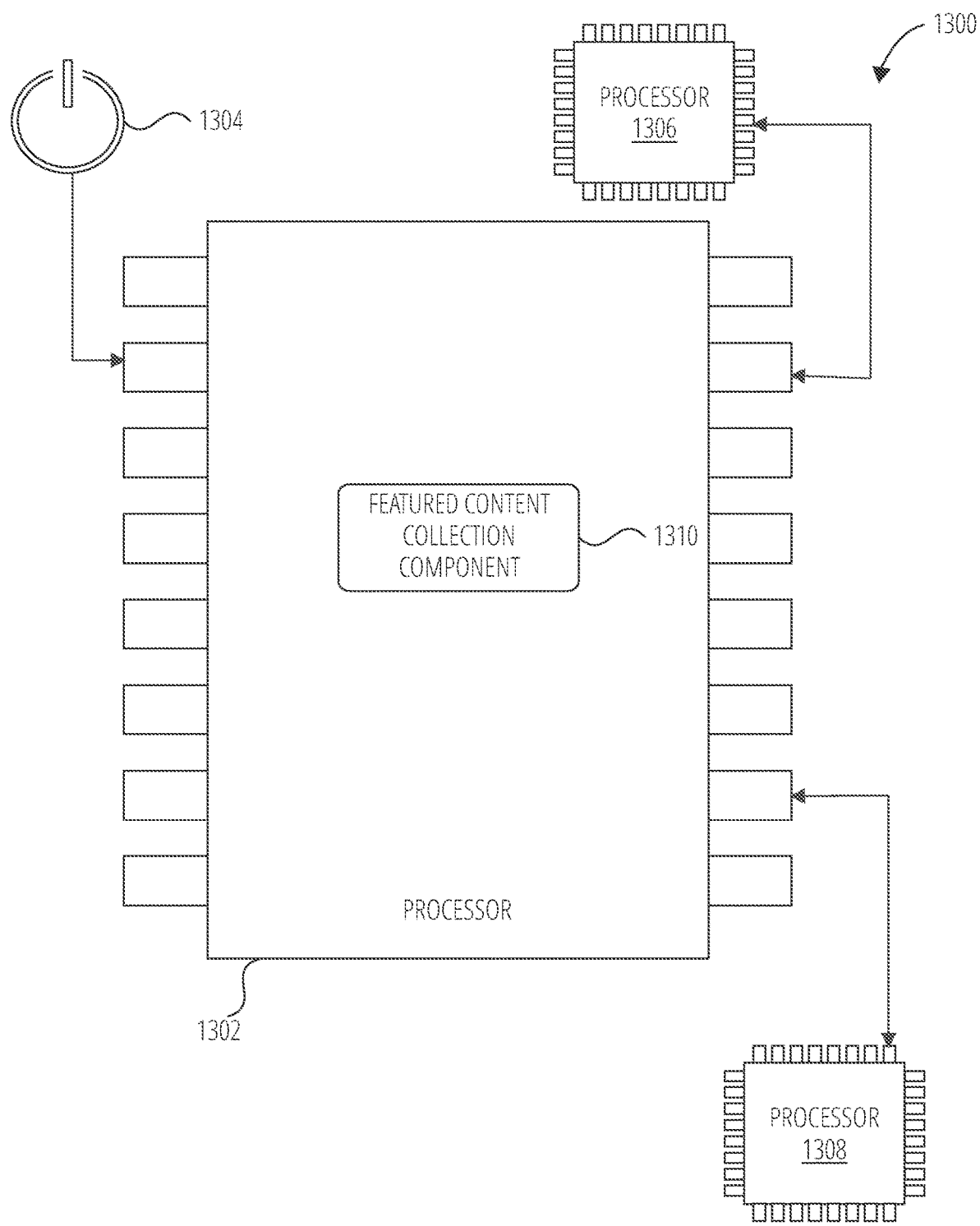
FIG. 13 is a diagrammatic representation of a processing environment, in accordance with some examples.

Turning now to FIG. 13, there is shown a diagrammatic representation of a processing environment 1300, which includes a processor 1302, a processor 1306, and a processor 1308 (e.g., a GPU, CPU or combination thereof).

The processor 1302 is shown to be coupled to a power source 1304, and to include (either permanently configured or temporarily instantiated) modules, namely a featured content collection component 1310. The featured content collection component 1310 operationally can generate receive a plurality of media content items, identify a first subset of media content items based on a first characteristic, identify a second subset of media content items based on a second characteristic, generate a first sequenced content collection and cause the first content collection interface to the displayed at the client device 102 or a computing device different then the client device 102. While not shown, the processor 1306 can alternatively include a featured content collection component 1310 that performs the operations of the featured content collection system 212. As illustrated, the processor 1302 is communicatively coupled to both the processor 1306 and the processor 1308.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A computer-implemented method, comprising:
    detecting a predetermined number of stored media content items at a first computing device during a specified time period;
    identifying a subset of the stored media content items that have been accessed at the first computing device based on a first characteristic;
    determining a display sequence for the identified subset based on creation dates associated with each media content item;
    generating a sequenced content collection comprising the identified subset in the determined display sequence; and
    presenting the generated sequenced content collection at the first computing device.

2. The computer-implemented method of claim 1, wherein the first characteristic comprises whether each media content item has been opened at the first computing device at least once.

3. The computer-implemented method of claim 1, wherein the display sequence arranges the identified subset chronologically based on creation dates.

4. The computer-implemented method of claim 1, further comprising:
    generating a notification overlay comprising a textual notification; and
    presenting the notification overlay at the first computing device in response to generating the sequenced content collection.

5. The computer-implemented method of claim 1, wherein the sequenced content collection comprises an interactive presentation of the identified subset.

6. The computer-implemented method of claim 1, wherein the identified subset comprises media content items capturing a user's social media interactions.

7. The computer-implemented method of claim 1, wherein the predetermined number of stored media content items comprises at least a threshold number of media content items stored within the specified time period.

8. A machine, comprising:
    one or more processors; and
    a memory storing instructions that, when executed by the one or more processors, cause the machine to perform operations comprising:
    detecting a predetermined number of stored media content items at a first computing device during a specified time period;
    identifying a subset of the stored media content items that have been accessed at the first computing device based on a first characteristic;
    determining a display sequence for the identified subset based on creation dates associated with each media content item;
    generating a sequenced content collection comprising the identified subset in the determined display sequence; and
    presenting the generated sequenced content collection at the first computing device.

9. The machine of claim 8, wherein the first characteristic comprises whether each media content item has been opened at the first computing device at least once.

10. The machine of claim 8, wherein the display sequence arranges the identified subset chronologically based on creation dates.

11. The machine of claim 8, wherein the operations further comprise:
    generating a notification overlay comprising a textual notification; and
    presenting the notification overlay at the first computing device in response to generating the sequenced content collection.

12. The machine of claim 8, wherein the sequenced content collection comprises an interactive presentation of the identified subset.

13. The machine of claim 8, wherein the identified subset comprises media content items capturing a user's social media interactions.

14. The machine of claim 8, wherein the predetermined number of stored media content items comprises at least a threshold number of media content items stored within the specified time period.

15. A machine-storage medium storing machine-executable instructions that, when executed by a machine, cause the machine to perform operations comprising:
    detecting a predetermined number of stored media content items at a first computing device during a specified time period;
    identifying a subset of the stored media content items that have been accessed at the first computing device based on a first characteristic;
    determining a display sequence for the identified subset based on creation dates associated with each media content item;
    generating a sequenced content collection comprising the identified subset in the determined display sequence; and
    presenting the generated sequenced content collection at the first computing device.

16. The machine-storage medium of claim 15, wherein the first characteristic comprises whether each media content item has been opened at the first computing device at least once.

17. The machine-storage medium of claim 15, wherein the display sequence arranges the identified subset chronologically based on creation dates.

18. The machine-storage medium of claim 15, wherein the operations further comprise:
    generating a notification overlay comprising a textual notification; and
    presenting the notification overlay at the first computing device in response to generating the sequenced content collection.

19. The machine-storage medium of claim 15, wherein the sequenced content collection comprises an interactive presentation of the identified subset.

20. The machine-storage medium of claim 15, wherein the predetermined number of stored media content items comprises at least a threshold number of media content items stored within the specified time period.

* * * * *